(12) United States Patent
Hara et al.

(10) Patent No.: US 11,484,864 B2
(45) Date of Patent: Nov. 1, 2022

(54) EXHAUST GAS-PURIFYING THREE-WAY CATALYST AND METHOD FOR PRODUCING SAME, AND INTEGRAL STRUCTURE TYPE EXHAUST GAS-PURIFYING CATALYST

(71) Applicant: N.E. CHEMCAT Corporation, Minato-ku (JP)

(72) Inventors: Hiroyuki Hara, Minato-ku (JP); Yuki Toya, Minato-ku (JP); Hiroki Nakayama, Minato-ku (JP); Takumi Nakamura, Minato-ku (JP)

(73) Assignee: N.E. CHEMCAT Corporation, Minato-ku (JP)

( * ) Notice: Subject to any disclaimer, the term of this patent is extended or adjusted under 35 U.S.C. 154(b) by 96 days.

(21) Appl. No.: 16/962,709

(22) PCT Filed: Jan. 28, 2019

(86) PCT No.: PCT/JP2019/002772
§ 371 (c)(1),
(2) Date: Jul. 16, 2020

(87) PCT Pub. No.: WO2019/167515
PCT Pub. Date: Sep. 6, 2019

(65) Prior Publication Data
US 2020/0353447 A1    Nov. 12, 2020

(30) Foreign Application Priority Data
Feb. 27, 2018 (JP) .............................. JP2018-032794

(51) Int. Cl.
*B01J 23/63* (2006.01)
*B01J 35/10* (2006.01)
(Continued)

(52) U.S. Cl.
CPC ........... *B01J 23/63* (2013.01); *B01J 35/1009* (2013.01); *B01J 35/1014* (2013.01); *B01J 37/08* (2013.01); *F01N 3/101* (2013.01)

(58) Field of Classification Search
CPC .. B01J 23/63; B01J 23/56; B01J 35/04; F01N 3/101; F01N 2370/02
See application file for complete search history.

(56) References Cited

U.S. PATENT DOCUMENTS 6,933,259 B2 * 8/2005 Hatanaka ................ C01B 13/14
502/262
2002/0090512 A1    7/2002 Hatanaka et al.
(Continued)

FOREIGN PATENT DOCUMENTS

CN    108138617 A *  6/2018  ........... B01D 53/945
EP    2502672 A1 *  9/2012  ........... B01D 53/945
(Continued)

OTHER PUBLICATIONS

CN 108138617A Google Patents translation (Year: 2022).*
International Search Report dated Mar. 12, 2019 in PCT/JP2019/002772 filed on Jan. 28, 2019, 2 pages.

*Primary Examiner* — Anthony J Zimmer
*Assistant Examiner* — Logan Edward Laclair
(74) *Attorney, Agent, or Firm* — Oblon, McClelland, Maier & Neustadt, L.L.P.

(57) ABSTRACT

Provided is, for example, an exhaust gas-purifying three-way catalyst which is suppressed in particle growth due to sintering of a catalytically active component on a carrier in exposure to a high temperature and thus is enhanced in purification performance, and a method for producing the same, as well as an integral structure type exhaust gas-purifying catalyst using the same.
The exhaust gas-purifying three-way catalyst of the present invention includes a composite particle which contains a
(Continued)

base material particle having a pore size of 100 to 650 nm as measured by a mercury intrusion method and a catalytically active particle of a platinum group element supported on the base material particle, in which a content proportion of the catalytically active particle is 0.001 to 30% by mass in total in terms of metal of the platinum group element, based on a total amount of the composite particle.

11 Claims, 4 Drawing Sheets

(51) Int. Cl.
  *B01J 37/08* (2006.01)
  *F01N 3/10* (2006.01)

(56) References Cited

U.S. PATENT DOCUMENTS

| | | |
|---|---|---|
| 2012/0264587 A1 | 10/2012 | Schermanz et al. |
| 2013/0052108 A1 | 2/2013 | Ifrah et al. |
| 2014/0030158 A1 | 1/2014 | Takagi et al. |
| 2014/0072492 A1 | 3/2014 | Ifrah et al. |
| 2014/0072493 A1 | 3/2014 | Kato et al. |
| 2015/0111727 A1 | 4/2015 | Nagashima |
| 2016/0121301 A1* | 5/2016 | Shingai .................. C01G 25/00 502/303 |

FOREIGN PATENT DOCUMENTS

| | | | | |
|---|---|---|---|---|
| JP | 2002-211908 A | | 7/2002 | |
| JP | 2002211908 A | * | 7/2002 | ........... B01D 53/945 |
| JP | 2013-500149 A | | 1/2013 | |
| JP | 2013-166130 A | | 8/2013 | |
| JP | 2014-506221 A | | 3/2014 | |
| JP | 2015-37784 A | | 2/2015 | |
| JP | 2017-185464 A | | 10/2017 | |
| WO | WO 2010/097307 A2 | | 9/2010 | |
| WO | WO 2011/083157 A1 | | 7/2011 | |
| WO | WO 2012/121085 A1 | | 9/2012 | |
| WO | WO 2012/137930 A1 | | 10/2012 | |
| WO | WO 2014/002667 A1 | | 1/2014 | |

* cited by examiner

EXHAUST GAS-PURIFYING THREE-WAY CATALYST AND METHOD FOR PRODUCING SAME, AND INTEGRAL STRUCTURE TYPE EXHAUST GAS-PURIFYING CATALYST

TECHNICAL FIELD

The present invention relates to an exhaust gas-purifying three-way catalyst where a catalytically active particle of a platinum group element is supported on a specified base material particle, and a method for producing the same, as well as an integral structure type exhaust gas-purifying catalyst.

BACKGROUND ART

Three-way catalysts (TWC) with platinum group elements (PGM: Platinum Group Metals) such as ruthenium, rhodium, palladium, osmium, iridium, and platinum as catalytically active components are widely used in purification of hydrocarbon (HC), carbon monoxide (CO), and nitrogen oxide (NOx) emitted from internal-combustion engines of automobiles and the like. There have been conventionally widely known three-way catalysts including carriers (base material particles) made of metal oxides such as alumina, zirconia, or ceria, and catalyst particles of Pt or the like supported on the carriers.

Such an exhaust gas-purifying catalyst includes a catalytically active component in the form of a fine particle supported on a carrier in order to not only reduce the amount of a relatively expensive PGM used, but also ensure a high catalytic activity. A problem, however, is that such a catalytically active component on a carrier, when exposed to a high temperature environment, causes particle sintering and thus particle growth, thereby resulting in a remarkable decrease in catalytically active site.

Patent Literature 1 discloses, as a technique for suppressing such catalyst particle sintering, for example, an exhaust gas-purifying catalyst where a carrier is a mixture of respective primary particles mixed in the order of nanometers, of an $Al_2O_3$ particle and a particle of a predetermined metal oxide, and a platinum group element is supported on the carrier. Such a technique, where a primary particle of $Al_2O_3$ and a primary particle of a predetermined metal oxide are mutually interposed, is thus believed to be suppressed in progression of particle growth of the primary particle of such a single oxide to consequently not only enable reductions in surface area and pore volume to be sufficiently suppressed, but also enable dispersibility of a catalyst component for supporting to be sufficiently retained.

Patent Literature 2 discloses, for example, an exhaust gas-purifying oxidation catalyst including a carrier made of AZT oxide or AZ oxide, and a noble metal which is supported on the carrier to catalyze oxidation of carbon monoxide. Such a technique allows an atom (ion) of such a noble metal such as palladium or platinum to be strongly fixed (supported) with oxygen interposed, at a basic site located on the surface of the carrier made of AZT oxide or AZ oxide, namely, a site of an atom or an atom group exhibiting basic properties, and thus is believed to be high in effect of suppressing sintering, to enable particle growth of the noble metal to be suppressed.

The exhaust gas-purifying catalysts of Patent Literatures 1 and 2, however, are each an exhaust gas-purifying catalyst for diesel engines, in which $Al_2O_3$ is used as a base material particle, and a problem is that heat resistance is insufficient and catalyst performance is rapidly deteriorated in an application of an internal-combustion engine which emits an exhaust gas at a higher temperature, such as a gasoline engine.

On the one hand, Patent Literature 3 discloses, as a three-way catalyst enhanced in heat resistance, an exhaust gas-purifying three-way catalyst including a $Zr_\alpha Pr_\beta Pd_\gamma O_{2-\delta}$ (wherein $\alpha+\beta+\gamma=1.000$ and $\delta$ is a value defined so that the charge neutrality condition is satisfied.) solid solution component where the content proportion of palladium is in the range from 0.05 to 7% by weight and the atomic ratio of Pr/(Zr+Pr) is in the range from 0.05 to 0.6.

On the other hand, Patent Literatures 4 and 5 each disclose, as a catalyst aid (oxygen storage material) having oxygen storage capacity (OSC), a ceria-zirconia-based metal oxide doped with a rare-earth element such as yttrium, lanthanum, neodymium, praseodymium, and gadolinium.

CITATION LIST

Patent Literatures

Patent Literature 1: International Publication No. WO 2012/121085
Patent Literature 2: International Publication No. WO 2012/137930
Patent Literature 3: Japanese Patent Laid-Open No. 2013-166130
Patent Literature 4: International Publication No. WO 2011/083157
Patent Literature 5: International Publication No. WO 2010/097307

SUMMARY OF INVENTION

Technical Problem

The exhaust gas-purifying three-way catalyst described in Patent Literature 3, however, has the problems of inferior productivity because of a need for heat treatment in the air at 800 to 1100° C. for several tens of hours for the purpose of obtaining a solid solution having a special crystal structure, and of sintering of the catalytically active component on the base material particle in exposure to a high temperature to cause particle growth and rapid deterioration in catalyst performance. On the other hand, Patent Literatures 4 and 5 each merely disclose a ceria-zirconia-based metal oxide as an oxygen storage material.

The present invention has been made in view of the above problems. That is, an object of the present invention is to provide, for example, an exhaust gas-purifying three-way catalyst which is suppressed in particle growth due to sintering of a catalytically active component on a carrier in exposure to a high temperature and thus is enhanced in purification performance, and a method for producing the same, as well as an integral structure type exhaust gas-purifying catalyst using the same.

Solution to Problem

The present inventors have made intensive studies in order to solve the above problems, and as a result, have found that the above problems can be solved by adopting a composite particle structure where a catalytically active particle of a platinum group element is supported on a base material particle having a relatively large pore size, thereby leading to completion of the present invention.

That is, the present invention provides various specific aspects described below.

(1) An exhaust gas-purifying three-way catalyst comprising a composite particle which comprises a base material particle having a pore size of 100 to 650 nm as measured by a mercury intrusion method and a catalytically active particle of a platinum group element supported on the base material particle, wherein a content proportion of the catalytically active particle is 0.001 to 30% by mass in total in terms of metal of the platinum group element, based on a total amount of the composite particle.

(2) The exhaust gas-purifying three-way catalyst according to (1), wherein the base material particle comprises a ceria-based oxygen storage material.

(3) The exhaust gas-purifying three-way catalyst according to (1) or (2), wherein the base material particle has a pore size of 100 to 650 nm as measured by a mercury intrusion method, and the catalytically active particle has an average particle size of 30 to 105 nm.

(4) The exhaust gas-purifying three-way catalyst according to any one of (1) to (3), wherein the base material particle has a BET specific surface area of 5 to 30 ($m^2$/g).

(5) The exhaust gas-purifying three-way catalyst according to any one of (1) to (4), wherein the base material particle has an average particle size $D_{50}$ of 0.5 to 30 μm.

(6) A method for producing an exhaust gas-purifying three-way catalyst, the method comprising at least: providing a base material particle; applying an aqueous solution comprising at least a platinum group element ion, to a surface of the base material particle; and subjecting the base material particle treated, to heat treatment and/or chemical treatment, thereby preparing a composite particle comprising a composite particle which comprises a base material particle having a pore size of 105 to 650 nm as measured by a mercury intrusion method and a catalytically active particle of a platinum group element supported on the base material particle, in which a content proportion of the catalytically active particle is 0.001 to 30% by mass in total in terms of metal of the platinum group element, based on a total amount of the composite particle.

(7) An integral structure type exhaust gas-purifying catalyst comprising a catalyst carrier and a catalyst layer provided on at least one surface of the catalyst carrier, wherein the catalyst layer comprises the exhaust gas-purifying three-way catalyst according to any one of (1) to (5).

Advantageous Effects of Invention

The present invention can realize, for example, an exhaust gas-purifying three-way catalyst enhanced in purification performance and a method for producing the same, as well as an integral structure type exhaust gas-purifying catalyst using the same. The exhaust gas-purifying catalyst of the present invention can be particularly suitably used as a three-way catalyst (TWC) which is a catalyst particle of a composite structure where a large number of fine active points (each corresponding to a catalytically active particle of a platinum group element) are supported on a base material particle, and which decreases NOx, CO, HC, and the like in an exhaust gas, based on the composition and structure thereof. The exhaust gas-purifying three-way catalyst or the like of the present invention can be mounted in a directly-under-engine type catalytic converter, a tandem-arranged directly-under type catalytic converter, and the like, and thus can be achieved in terms of a decrease in canning cost, for example.

DESCRIPTION OF EMBODIMENTS

Figure 1:
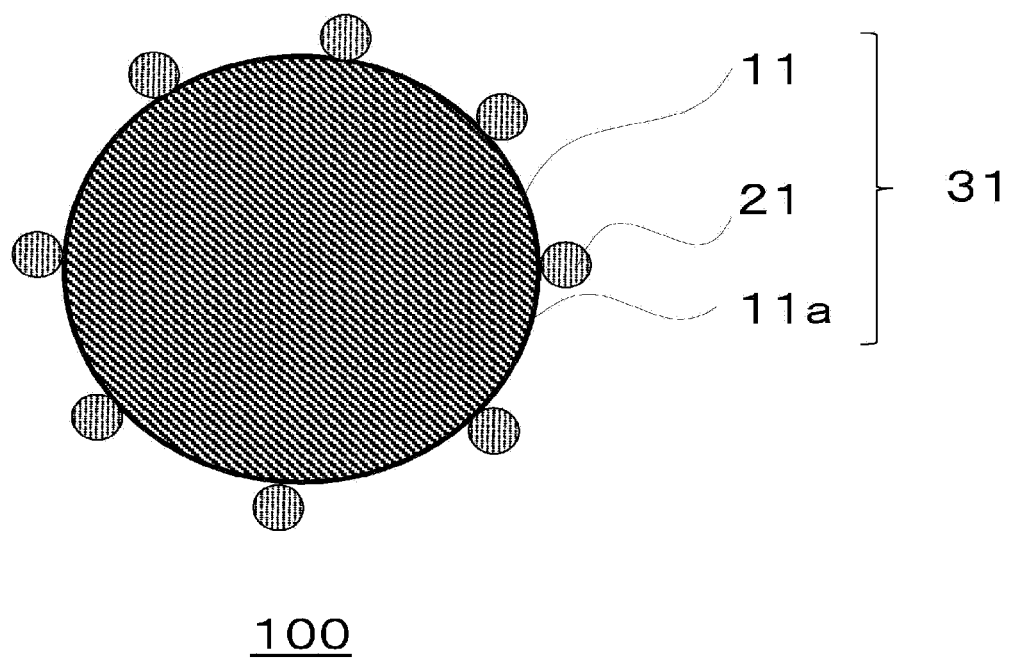
FIG. 1 is a schematic view illustrating a schematic configuration of an exhaust gas-purifying three-way catalyst 100 of one embodiment.

Hereinafter, embodiments of the present invention will be described in detail with reference to the drawings. Herein, the positional relation of the left, right, top and bottom is based on the positional relation illustrated in the drawings, unless otherwise noted. Herein, the dimension scale in the drawings is also not limited to the scale illustrated in the drawings. It is noted that the following embodiments are illustrative for describing the present invention and the present invention is not limited thereto. That is, the present invention can be arbitrarily modified and carried out without departing from the gist thereof. Herein, for example, the designation "1 to 100" as the numerical range includes both the upper limit "100" and the lower limit "1". The same is true on the designation of other numerical range.

FIG. 1 is a schematic view illustrating a schematic configuration of an exhaust gas-purifying three-way catalyst 100 of one embodiment of the present invention. The exhaust gas-purifying three-way catalyst 100 includes a composite particle 31 containing a base material particle 11 having a pore size of 100 to 650 nm as measured by a mercury intrusion method, and a catalytically active particle 21 of a platinum group element supported on a surface 11a of the base material particle 11, in which the content proportion of the catalytically active particle 21 is 0.001 to 30% by mass in total in terms of metal of the platinum group element, based on the total amount of the composite particle 31. Hereinafter, each constituent component will be described in detail.

The base material particle 11 is a carrier particle, where the catalytically active particle 21 is to be supported on the surface 11a thereof. The exhaust gas-purifying three-way catalyst 100 of the present embodiment, where such a base material particle 11 having a relatively large pore size is used, thus allows for a reduction in opportunity for contacting of the catalytically active particle 21 on the base material particle 11, and therefore is suppressed in particle growth due to sintering of the catalytically active particle 21 in exposure to a high temperature and is suppressed in deterioration in purification performance.

The pore size of the base material particle 11, as measured by a mercury intrusion method, is preferably 100 to 650 nm from such a viewpoint. The pore size of the base material particle 11 herein means a value calculated as measured by a mercury intrusion method. The pore size of the base material particle 11 is herein defined as a value at the position of a peak top in a pore distribution curve of pore size-differential pore volume, the curve being obtained by measuring the pore volume in conditions described in Examples below.

The material of the base material particle 11 can be appropriately selected from those known in the art, depending on the required performance, and the type thereof is not particularly limited. Specific examples include a ceria-based oxygen storage material (for example, ceria-based (composite) oxide) having oxygen storage capacity, and a zirconia-based highly heat-resistant material (for example, zirconia-based (composite) oxide) more excellent in heat resistance than alumina, but are not particularly limited thereto. Such materials can be used singly or in appropriate combinations of two or more thereof.

Herein, the "ceria-based (composite) oxide" is used as a term encompassing both a ceria-based oxide and a ceria-based composite oxide, and is specifically used for a concept encompassing ceria ($CeO_2$), or a composite oxide or a solid solution thereof doped with any other element.

The "zirconia-based (composite) oxide" is again used as a term encompassing both a zirconia-based oxide and a zirconia-based composite oxide, and is specifically used for a concept encompassing zirconia ($ZrO_2$), or a composite oxide or a solid solution thereof doped with any element other than cerium. It is noted that a cerium-zirconium-based composite oxide containing both cerium and zirconium is regarded as corresponding to the former ceria-based composite oxide for having oxygen storage capacity and not corresponding to the latter zirconia-based composite oxide.

Specific examples of the ceria-based (composite) oxide include cerium (IV) oxide, a rare-earth element composite oxide excluding cerium-cerium, a cerium-transition element composite oxide, and a rare-earth element-transition element composite oxide excluding cerium-cerium. In particular, the ceria-based oxygen storage material is preferably a ceria-zirconia-based composite oxide excellent in balance between oxygen storage capacity and heat resistance, more preferably a ceria-zirconia-based composite oxide forming a solid solution with any rare-earth element other than cerium and zirconium. The ceria-based (composite) oxide preferably used herein is any oxide where the total mass rate of Ce and Zr is 50% by mass or more and 90% by mass or less in terms of oxides ($CeO_2$ and $ZrO_2$).

Specific examples of the zirconia-based (composite) oxide include zirconium oxide (IV), a rare-earth element composite oxide excluding zirconium-cerium and zirconium, a zirconium-transition element composite oxide, and a rare-earth element-transition element composite oxide excluding zirconium-cerium and zirconium. In particular, the zirconia-based highly heat-resistant material is more preferably a zirconia-based composite oxide forming a solid solution with any rare-earth element other than cerium and zirconium, for example, from the viewpoint of the balance among heat resistance, toughness, and the like. The zirconia-based (composite) oxide preferably used herein is any oxide where the mass rate of Zr is 50% by mass or more and 80% by mass or less in terms of oxide ($ZrO_2$).

The ceria-based (composite) oxide and the zirconia-based (composite) oxide may each include any rare-earth element (hereinafter, sometimes referred to as "other rare-earth element".) other than cerium and zirconium, such as scandium, yttrium, lanthanum, praseodymium, neodymium, promethium, samarium, europium, gadolinium, terbium, dysprosium, holmium, erbium, thulium, ytterbium, and lutetium. In particular, yttrium, lanthanum, praseodymium, and neodymium are preferable. Such any other rare-earth elements can be used singly or in appropriate combinations of two or more thereof. When such any other rare-earth element is included, the content proportion thereof is not particularly limited and is preferably 0.1% by mass or more, more preferably 3% by mass or more, further preferably 5% by mass or more, and preferably 55% by mass or less, more preferably 50% by mass or less, further preferably 45% by mass or less, as the total amount in terms of oxide of such any other rare-earth element (for example, the total of $La_2O_3$, $Nd_2O_3$, and $Pr_5O_{11}$), based on the total amount of the base material particle 11.

The ceria-based (composite) oxide and the zirconia-based (composite) oxide may each include a transition element such as chromium, cobalt, iron, nickel, titanium, manganese, and copper. Such transition elements can be used singly or in appropriate combinations of two or more thereof. When the transition element is included, the content proportion thereof is not particularly limited and is preferably 0.01% by mass or more, more preferably 0.1% by mass or more, further preferably 0.5% by mass or more, and preferably 10% by mass or less, more preferably 5% by mass or less, further preferably 3% by mass or less, as the total amount in terms of oxide of the transition element (for example, the total of $Fe_2O_3$ and $TiO_2$), based on the total amount of the base material particle 11.

Herein, cerium and zirconium in the ceria-based (composite) oxide and the zirconia-based (composite) oxide may each be partially substituted with an alkali metal element such as lithium, sodium, or potassium, or an alkali earth metal element such as beryllium, magnesium, calcium, strontium, or barium. Such alkali metal elements and alkali earth metal elements can be used singly, or in any combinations or at any ratio of two or more thereof. The ceria-based (composite) oxide and the zirconia-based (composite) oxide may each contain hafnium (Hf), as an inevitable impurity, usually included at a rate of about 1 to 2% by mass in zirconia ore.

The average particle size $D_{50}$ of the base material particle 11 can be appropriately set depending on the desired performance, and is not particularly limited. The average particle size $D_{50}$ of the base material particle 11 is preferably 0.5 µm or more, more preferably 1 µm or more, further preferably 2 µm or more, and preferably 30 µm or less, more preferably 15 µm or less, further preferably 10 µm or less from the viewpoint that, for example, not only a large specific surface area is retained, but also heat resistance is enhanced, resulting in an increase in the number of catalytically active sites in such a particle by itself. The average particle size $D_{50}$ of the base material particle 11 herein means the median size measured with a laser diffraction type particle size distribution measuring apparatus (for example, laser diffraction type particle size distribution measuring apparatus SALD-3100 manufactured by Shimadzu Corporation). The average particle size $D_{50}$ of the base material particle 11 herein means a value measured by use of a sample obtained by subjecting the exhaust gas-purifying three-way catalyst 100 serving as a measuring object to aging treatment (duration treatment). The duration treatment is here performed for the purpose of aiming at stabilization of running performance of the three-way catalyst. The aging treatment is made by performing heat treatment at 1050° C. for 12 hours with the external atmosphere being sequentially switched to A/F=12.8 and an oxygen atmosphere. Also hereinafter, any value with "after duration treatment" designated means a value after heat treatment.

The BET specific surface area of the base material particle 11 can be appropriately set depending on the desired performance and is not particularly limited, and the BET specific surface area according to a BET one-point method is preferably 5 m²/g or more, more preferably 7 m²/g or more, further preferably 9 m²/g or more, and preferably 30 m²/g or less, more preferably 28 m²/g or less, further preferably 26 m²/g or less from the viewpoint that, for example, high catalyst performance is obtained. The BET specific surface area of the exhaust gas-purifying three-way catalyst 100 herein means a value obtained by measurement by use of the exhaust gas-purifying three-way catalyst 100 after duration treatment, as a sample.

The catalytically active particle 21 of a platinum group element is supported on the base material particle 11, in a highly dispersed manner. The type of the catalytically active particle 21 is not particularly limited as long as the particle includes at least one platinum group element (PGM) selected from the group consisting of Pt, Pd, Ir, Rh, Ru, and Os. At least one of Pt, Pd, and Rh is preferable from the viewpoint of purification performance or the like.

The content proportion of the catalytically active particle 21 may be appropriately set depending on the desired performance in consideration of the material, the pore size and the like of the base material particle 11 and is not particularly limited, and is preferably 0.001 to 30% by mass, more preferably 0.1 to 10% by mass, further preferably 0.3 to 6% by mass in total in terms of metal of the platinum group element based on the total amount of the composite particle 31 from the viewpoint of catalyst activity and the like.

The average particle size of the catalytically active particle 21 on the base material particle 11 may be appropriately set depending on the desired performance in consideration of the material, the pore size, and the like of the base material particle 11, and is not particularly limited. The average particle size of the catalytically active particle 21 is preferably 30 nm or more, preferably 35 nm or more, preferably 40 nm or more, and preferably 300 µm or less, more preferably 270 µm or less, further preferably 250 µm or less, from the viewpoint of, for example, not only a more enhancement in catalyst activity, but also suppression of sintering and particle growth. Such a catalytically active particle 21 having a fine particle size is present in the surface 11a of the base material particle 11, resulting in tendencies to easily maintain a larger surface area and easily maintain more catalytically active sites. The average particle size of the catalytically active particle 21 here refers to an average with respect to 20 points randomly selected in a SEM image at a 10000-fold magnification. The average particle size of the catalytically active particle 21 on the base material particle 11 of the exhaust gas-purifying three-way catalyst 100 means a value obtained by measurement by use of the exhaust gas-purifying three-way catalyst 100 after duration treatment, as a sample.

One example of a particularly preferable aspect of the exhaust gas-purifying three-way catalyst 100 of the present embodiment is one using any composite particle 31 where the base material particle 11 is a ceria-zirconia-based composite oxide doped with other rare-earth element and the catalytically active particle 21 of a platinum group element is supported on the surface 11a of the base material particle 11 (hereinafter, sometimes referred to as "exhaust gas-purifying three-way catalyst 100A".). Such a ceria-zirconia-based composite oxide doped with other rare-earth element suitably includes, as constituent metal elements, Nd and Pr at the following mass proportions in terms of oxide.

| | |
|---|---|
| $CeO_2$ | 10 to 50% by mass |
| $ZrO_2$ | 40 to 80% by mass |
| $Nd_2O_3$ | 0.1 to 10% by mass |
| $Pr_5O_{11}$ | 0.1 to 10% by mass |

The ceria-zirconia-based composite oxide doped with other rare-earth element in the exhaust gas-purifying three-way catalyst 100A suitably includes, as constituent metal elements, Nd and Pr at the following mass proportions in terms of oxide.

| | |
|---|---|
| $CeO_2$ | 20 to 40% by mass |
| $ZrO_2$ | 50 to 70% by mass |
| $Nd_2O_3$ | 4 to 9% by mass |
| $Pr_5O_{11}$ | 4 to 9% by mass |

The pore size of the base material particle 11 in the exhaust gas-purifying three-way catalyst 100A is preferably 100 to 650 nm, more preferably 100 to 620 nm, further preferably 110 to 500 nm, particularly preferably 120 to 350 nm, as measured by a mercury intrusion method. The average particle size of the catalytically active particle 21 on the base material particle 11, after duration treatment, is usually preferably 30 nm or more and 105 nm or less, although varies depending on the pore size of the base material particle 11, and the average particle size is more preferably 45 nm or more, further preferably 50 nm or more, particularly preferably 55 nm or more, and more preferably 103 µm or less, further preferably 101 µm or less, particularly preferably 100 µm or less, from the viewpoint of, for example, not only a more enhancement in catalyst activity, but also suppression of sintering and particle growth.

The average particle size $D_{50}$ of the base material particle 11 in the exhaust gas-purifying three-way catalyst 100A, after duration treatment, is preferably 1 µm or more, more preferably 2 µm or more, further preferably 3 µm or more, and preferably 15 µm or less, more preferably 12 µm or less, further preferably 9 µm or less from the viewpoint that, for example, not only a large specific surface area is retained, but also heat resistance is enhanced, resulting in an increase in the number of catalytically active sites in such a particle by itself.

The BET specific surface area of the base material particle 11 in the exhaust gas-purifying three-way catalyst 100A, after duration treatment, is preferably 5 m²/g or more, more preferably 7 m²/g or more, further preferably 9 m²/g or more, and preferably 30 m²/g or less, more preferably 25 m²/g or less, further preferably 23 m²/g or less as the BET specific surface area according to a BET one-point method, from the viewpoint that, for example, high catalyst performance is obtained.

Another example of a particularly preferable aspect of the exhaust gas-purifying three-way catalyst 100 of the present embodiment is one using any composite particle 31 where the base material particle 11 is a zirconia-based composite oxide doped with other rare-earth element and the catalytically active particle 21 of a platinum group element is supported on the surface 11a of the base material particle 11 (hereinafter, sometimes referred to as "an exhaust gas-purifying three-way catalyst 100B".). Such a zirconia-based composite oxide doped with other rare-earth element suitably includes, as constituent metal element(s), Nd and/or Pr at the following mass proportions in terms of oxide.

| | |
|---|---|
| ZrO$_2$ | 50 to 70% by mass |
| Nd$_2$O$_3$ | 0 to 50% by mass |
| Pr$_5$O$_{11}$ | 0 to 50% by mass |
| Total amount of Nd$_2$O$_3$ and Pr$_5$O$_{11}$ | 30 to 50% by mass |

The zirconia-based composite oxide doped with other rare-earth element in the exhaust gas-purifying three-way catalyst 100B more suitably includes, as constituent metal element(s), Nd and/or Pr at the following mass proportions in terms of oxide.

| | |
|---|---|
| ZrO$_2$ | 50 to 65% by mass |
| Nd$_2$O$_3$ | 0 to 48% by mass |
| Pr$_5$O$_{11}$ | 0 to 49% by mass |
| Total amount of Nd$_2$O$_3$ and Pr$_5$O$_{11}$ | 35 to 48% by mass |

The pore size of the base material particle 11 in the exhaust gas-purifying three-way catalyst 100B is preferably 100 to 650 nm, more preferably 100 to 300 nm, further preferably 110 to 300 nm, particularly preferably 120 to 200 nm, as measured by a mercury intrusion method. The average particle size of the catalytically active particle 21 on the base material particle 11, after duration treatment, is usually preferably 200 nm or more and 230 nm or less, although varies depending on the pore size of the base material particle 11, and the average particle size is more preferably 205 nm or more, further preferably 210 nm or more, and more preferably 225 μm or less, further preferably 220 μm or less, from the viewpoint of, for example, not only a more enhancement in catalyst activity, but also suppression of sintering and particle growth.

The average particle size D$_{50}$ of the base material particle 11 in the exhaust gas-purifying three-way catalyst 100B, after duration treatment, is preferably 1 μm or more, more preferably 2 μm or more, further preferably 3 μm or more, and preferably 15 μm or less, more preferably 12 μm or less, further preferably 9 μm or less, from the viewpoint that, for example, not only a large specific surface area is retained, but also heat resistance is enhanced, resulting in an increase in the number of catalytically active sites in such a particle by itself.

The BET specific surface area of the base material particle 11 in the exhaust gas-purifying three-way catalyst 100B, after duration treatment, is preferably 10 m$^2$/g or more, more preferably 11 m$^2$/g or more, further preferably 12 m$^2$/g or more, and preferably 25 m$^2$/g or less, more preferably 20 m$^2$/g or less, further preferably 16 m$^2$/g or less as the BET specific surface area according to a BET one-point method, from the viewpoint that, for example, high catalyst performance is obtained.

Any of commercially available products of various grades can be used in the base material particle 11. For example, a ceria-based oxygen storage material and a zirconia-based highly heat-resistant material having the above compositions can also be produced according to any method known in the art. Such a production method is not particularly limited, and a co-precipitation method and an alkoxide method are preferable.

The co-precipitation method is preferably, for example, a production method including adding an alkali substance to an aqueous solution obtained by mixing a cerium salt and/or a zirconium salt, and other rare-earth metal element or a transition element, if necessary blended, at a predetermined stoichiometric ratio, resulting in hydrolysis or co-precipitating of a precursor, and firing the hydrolyzed product or co-precipitated product. The types of various salts here used are not particularly limited. In general, hydrochloride, oxyhydrochloride, nitrate, oxynitrate, carbonate, phosphate, acetate, oxalate, citrate, and the like are preferable. The type of the alkali substance is also not particularly limited. In general, an aqueous ammonia solution is preferable. The alkoxide method is preferably, for example, a production method including hydrolyzing a mixture obtained by mixing cerium alkoxide and/or zirconium alkoxide, and other rare-earth metal element or a transition element, if necessary blended, at a predetermined stoichiometric ratio, and thereafter firing the resultant. The type of the alkoxide here used is not particularly limited. In general, methoxide, ethoxide, propoxide, isopropoxide, butoxide, an ethylene oxide adduct thereof, and the like are preferable. The rare-earth metal element may be blended as a metal alkoxide or any of various salts described above.

The firing conditions may be according to an ordinary method and is not particularly limited. The firing atmosphere may be any atmosphere of an oxidizing atmosphere, a reducing atmosphere, and an air atmosphere. The firing temperature and the treatment time are varied depending on the desired composition and the stoichiometric ratio, and are generally preferably 150° C. or more and 1300° C. or less and 1 to 12 hours, more preferably 350° C. or more and 800° C. or less and 2 to 4 hours, respectively, from the viewpoint of productivity and the like. It is here preferable to perform drying under reduced pressure by use of a vacuum dryer or the like and drying treatment at 50° C. or more and 200° C. or less for about 1 to 48 hours, prior to firing at a high temperature.

One feature of the exhaust gas-purifying three-way catalyst 100 of the present embodiment has a composite particle structure where the catalytically active particle 21 of a platinum group element is supported on the surface 11a of the base material particle 11 in a highly dispersed manner, as described above. Such a composite particle structure is adopted, thereby allowing the exhaust gas-purifying three-way catalyst 100 to be significantly suppressed in degradation in catalyst performance after exposure to a high temperature. The reason for this is not clear, but is presumed because the base material particle 11 having a relatively large pore size is used to thereby dispose the catalytically active particle 21 on the base material particle 11 away at a certain distance which cannot cause any mutual contact, thereby resulting in suppression of particle growth due to sintering of the catalytically active particle 21 on the base material particle 11 in exposure to a high temperature. In addition, a ceria-zirconia-based composite oxide or a zirconia-based composite oxide relatively excellent in heat resistance is used for the base material particle 11, also resulting in an enhancement in heat resistance of the catalyst by itself. It is presumed that such results cooperate to allow for realizing of an exhaust gas-purifying three-way catalyst 100 excellent in three-way purification performance. The action, however, is not limited thereto.

The catalytically active particle 21 supported on the base material particle 11 typically serves as a main catalytically active site in the exhaust gas-purifying three-way catalyst 100 of the present embodiment. The catalytically active particle 21 can be changed into a simple metal or a metal oxide depending on the external environment. Thus, the catalytically active particle 21 may be confirmed at least in a reducing atmosphere, and properties of the catalytically active particle 21 in an oxidizing atmosphere or a stoichiometric atmosphere are not particularly limited. The reducing atmosphere herein means a state where standing is conducted in a hydrogen gas atmosphere at 400° C. for 0.5 hours or more. The catalytically active particle 21 can be confirmed at a 1000000-fold magnification by use of, for example, a scanning transmission electron microscope (STEM), HD-2000 manufactured by Hitachi High-Technologies Corporation.

The presence of the catalytically active particle 21 on the base material particle 11 can be seen according to any of various measurement procedures such as observation with a scanning transmission electron microscope (STEM), or powder X-ray diffraction (XRD: X-ray Diffraction, electron probe micro analyzer (EPMA), X-ray photoelectron spectroscopy (XPS or ESCA: Electron Spectroscopy for Chemical Analysis).

The content of the catalytically active particle 21 of a platinum group element supported on the base material particle 11 can be appropriately determined depending on the desired performance, and is not particularly limited, and the content is preferably 0.001 to 30% by mass, more preferably 0.1 to 10% by mass, further preferably 0.3 to 6% by mass in terms of amount of the metal of the platinum group element based on the total amount of the exhaust gas-purifying three-way catalyst 100, from the viewpoints of an enhancement in catalyst performance throughout the whole region from a lean environment to a stoichiometric environment to a rich environment and also an enhancement in low-temperature activity.

The exhaust gas-purifying three-way catalyst 100 of the present embodiment may contain any noble metal element (gold (Au) and silver (Ag)) other than the catalytically active particle 21 of a platinum group element. The catalyst preferably does not substantially contain any noble metal element (PM) other than the platinum group element, in consideration of economic efficiency, stable feeding, use in a condition of a high temperature, and the like. The "not substantially contain" here means that the total amount of such any noble metal element other than the platinum group element is in the range of 0% by mass or more and less than 1.0% by mass based on the total amount of the exhaust gas-purifying three-way catalyst, and is more preferably 0% by mass or more and less than 0.5% by mass, further preferably 0% by mass or more and less than 0.3% by mass.

A mode of use of the exhaust gas-purifying three-way catalyst 100 is not particularly limited, and the catalyst can be used in a mode known in the art. For example, a catalyst powder as an aggregate of the catalyst particle where the catalytically active particle 21 of a platinum group element is supported on the base material particle 11 can be used as it is. The catalyst powder can also be subjected to molding to any shape and thus formed into a particulate or pellet-shaped molded catalyst. The catalyst powder can also be retained (supported) on a catalyst carrier and thus used as an integral structure type exhaust gas-purifying catalyst. The catalyst carrier here used can be appropriately selected from those known in the art. Representative examples include ceramic monolith carriers of cordierite, silicon carbide, and silicon nitride, metal honeycomb carriers made of stainless steel, wire mesh carriers made of stainless steel, and steel wool-like knitted wire carriers, but are not particularly limited thereto. The shape is also not particularly limited, and can be selected from any shapes such as a prism shape, a cylindrical shape, a spherical shape, a honeycomb shape, and a sheet shape. Such shapes can be used singly or in appropriate combinations of two or more thereof.

The exhaust gas-purifying three-way catalyst 100 can be, for example, used as a catalyst for purifying an exhaust gas of an diesel engine, a gasoline engine, a jet engine, a boiler, a gas turbine, and the like, and is useful as an exhaust gas-purifying catalyst for an internal-combustion engine, in particular, an exhaust gas-purifying three-way catalyst for an automobile.

A method for producing the exhaust gas-purifying three-way catalyst 100 of the present embodiment is not particularly limited as long as the composite particle 31 where the catalytically active particle 21 of a platinum group element is supported on the base material particle 11 having a predetermined pore size, as described above, is obtained. An evaporation drying method (impregnation method) or the like is preferable from the viewpoint that the exhaust gas-purifying three-way catalyst 100 having the above configuration is produced at high reproducibility in a simple and low-cost manner.

A preferable evaporation drying method is preferably a production method including impregnating the base material particle 11 having a pore size of 100 to 650 nm, as measured by the mercury intrusion method, with an aqueous solution containing at least a platinum group element ion, and thereafter performing heat treatment or chemical treatment. The impregnation treatment allows the platinum group element ion to adhere (be attached) to the surface 11a of the base material particle 11 in a highly dispersed state. The average particle size $D_{50}$ of the base material particle 11 here used as a raw material is not particularly limited, and is preferably 0.5 to 10 μm, more preferably 1 to 5 μm, further preferably 1 to 3 μm. The platinum group element ion can be here blended in the aqueous solution, as any of various salts of the platinum group element. The type of such any of various salts here used is not particularly limited. In general, sulfate, hydrochloride, oxyhydrochloride, nitrate, oxynitrate, carbonate, oxycarbonate, phosphate, acetate, oxalate, citrate, chloride, oxide, a composite oxide, a complex salt, and the like are preferable. The content proportion of the platinum group element ion in the aqueous solution can be appropriately adjusted so that a desired content proportion of the catalytically active particle 21 of each of the platinum group elements in the resulting exhaust gas-purifying three-way catalyst 100 is achieved, and is not particularly limited. Needless to say, the aqueous solution here used may include any optional component described above, for example, not only other rare-earth element and a transition element, but also inevitable impurities.

After the impregnation treatment, solid-liquid separation treatment, water-washing treatment, drying treatment for removal of moisture, for example, in the air at a temperature of about 50° C. or more and 200° C. or less for about 1 to 48 hours, and/or the like can be, if necessary, performed according to ordinary method(s). The drying treatment may be natural drying, or may be made by use of a drying apparatus such as a drum type dryer, a reduced pressure dryer, or spray drying. The atmosphere in the drying treatment may be any of an air atmosphere, a vacuum atmosphere, and any atmosphere of an inert gas such as a nitrogen gas. Herein, grinding treatment, classification treatment, or the like may be, if necessary, further performed before and after such drying. Alternatively, chemical treatment may also be performed, and, for example, the platinum group element ion may be subjected to hydrolysis on the surface 11a of the base material particle 11 by use of a basic component, after the impregnation treatment in the evaporation drying method. A preferable basic component here used is ammonia, an amine such as ethanolamine, an alkali metal hydroxide such as caustic soda or strontium hydroxide, or an alkali earth metal hydroxide such as barium hydroxide. Such heat treatment or chemical treatment allows for production of a catalytically active particle 21 of each of the platinum group elements in a highly dispersed manner in the order of nanometers, on the surface 11a of the base material particle 11.

The firing conditions may be according to an ordinary method and are not particularly limited. A heating unit is not particularly limited, and, for example, any known equipment such as an electric furnace or a gas furnace can be used. The firing atmosphere may be any of an oxidizing atmosphere, an air atmosphere, and a reducing atmosphere, and an oxidizing atmosphere and an air atmosphere are preferable. The firing temperature and the treatment time are varied depending on the desired performance, and are generally preferably 500° C. or more and 1100° C. or less and 0.1 to 12 hours, more preferably 550° C. or more and 800° C. or less and 0.5 to 6 hours, respectively, from the viewpoint of production, productivity and the like of the catalytically active particle 21 of each of the platinum group elements.

The exhaust gas-purifying three-way catalyst 100 thus obtained can be used as a powder by itself as an aggregate of the catalyst particle, and can be mixed with a catalyst, a catalyst aid and/or a catalyst carrier known in the art, and/or an additive known in the art for use. The exhaust gas-purifying three-way catalyst 100 can also be used as a particulate or pellet-shaped molded article (molded catalyst) by preparing a composition including the three-way catalyst in advance, and molding the composition into any predetermined shape. Any of various known dispersion apparatuses, kneading apparatuses, and molding apparatuses can be used in production of the molded article. In the case of use as the molded article, the content of the exhaust gas-purifying three-way catalyst 100 in the molded article is not particularly limited, and is preferably 10% by mass or more and 99% by mass or less, more preferably 20% by mass or more and 99% by mass or less, further preferably 30% by mass or more and 99% by mass or less based on the total amount.

Examples of such known catalyst, catalyst aid, and/or catalyst carrier which can be used in combination include metal oxides or metal composite oxides such as silica, alumina, lanthanum oxide, neodymium oxide, and praseodymium oxide; perovskite-type oxides; composite oxides including alumina, such as silica-alumina, silica-alumina-zirconia, and silica-alumina-boria; and a barium compound and zeolite, but are not particularly limited thereto. The rate of the catalyst, catalyst aid, and/or catalyst carrier used in combination can be appropriately set depending on the required performance or the like and is not particularly limited, and the rate is preferably 0.01% by mass or more and 20% by mass or less in total, more preferably 0.05% by mass or more and 10% by mass or less in total, further preferably 0.1% by mass or more and 8% by mass or less in total based on the total amount.

Examples of such an additive which can be used in combination include various binders, dispersion stabilizers such as a nonionic surfactant and an anionic surfactant, pH adjusters, and viscosity modifiers, but are not particularly limited thereto. Examples of the binder include various sols such as alumina sol, titania sol, silica sol, and zirconia sol, but are not particularly limited thereto. A soluble salt such as aluminum nitrate, aluminum acetate, titanium nitrate, titanium acetate, zirconium nitrate, or zirconium acetate can also be used as each of the binders. Any other acid such as acetic acid, nitric acid, hydrochloric acid, or sulfuric acid can also be used as each of the binders. The amount of the binder used is not particularly limited and may be any amount necessary for maintaining the molded article. The rate of the above additive used can be appropriately set depending on the required performance or the like and is not particularly limited, and is preferably 0.01 to 20% by mass in total, more preferably 0.05 to 10% by mass in total, further preferably 0.1 to 8% by mass in total based on the total amount.

A noble metal element and/or a platinum group element may be, if necessary, further supported on the exhaust gas-purifying three-way catalyst 100 obtained as above. Any known procedure can be applied to the method for supporting the noble metal element and/or the platinum group element, and is not particularly limited. For example, the noble metal element and/or the platinum group element can be supported by preparing a salt solution including the noble metal element and/or the platinum group element, impregnating the exhaust gas-purifying three-way catalyst 100 with such a salt-containing solution, and performing, if necessary, drying treatment and then firing. The salt-containing solution is not particularly limited, and an aqueous nitrate solution, a dinitrodiammine nitrate solution, an aqueous chloride solution, and the like are preferable. The firing treatment is not particularly limited, and is preferably made at 500° C. or more and 1100° C. or less for 0.1 to 12 hours, more preferably at 550° C. or more and 800° C. or less for 0.5 to 6 hours. The firing treatment is preferably made at 350° C. or more and 1000° C. or less for about 1 to 12 hours.

The exhaust gas-purifying three-way catalyst 100 of the present embodiment can be used with being blended in a catalyst layer of an integral structure type exhaust gas-purifying catalyst. The integral structure type exhaust gas-purifying catalyst is a catalyst member of a layered structure including at least a catalyst carrier and a catalyst layer provided on at least one surface of the catalyst carrier. Such a configuration is adopted to thereby allow applicability to various applications to be increased, for example, allow incorporation into an apparatus to be facilitated. For example, in the case of an exhaust gas purification application, exhaust gas purification can be performed at a high efficiency by using a honeycomb structure carrier or the like as the catalyst carrier, disposing an integral structure type layered catalyst member in a flow passage through which a gas stream passes, and allowing the gas stream to pass into a cell of the honeycomb structure carrier.

Herein, the "provided on at least one surface of the catalyst carrier" means to encompass an aspect where any other layer(s) (for example, a primer layer and/or an adhesion layer) is/are interposed between one surface of the catalyst carrier and the catalyst layer. That is, the "provided on at least one surface", as used herein, means to encompass both an aspect where the catalyst carrier and the catalyst layer are directly placed and an aspect where the catalyst carrier and the catalyst layer are disposed with such any other layer(s) being interposed therebetween. The catalyst layer may be provided on only one surface or a plurality of surfaces (for example, one main surface and other main surface) of the catalyst carrier.

Such an integral structure type exhaust gas-purifying catalyst can be realized by, for example, providing a catalyst layer containing the exhaust gas-purifying three-way catalyst 100 of the present embodiment, on a catalyst carrier, for example, the above ceramic monolith carrier. The catalyst area of the integral structure type exhaust gas-purifying catalyst may correspond to a catalyst layer of only one single layer, a layered article including two or more catalyst layers, or a layered article where one or more catalyst layers and one or more other layers known in the art are combined. For example, when the integral structure type exhaust gas-purifying catalyst has a multi-layer configuration having at least an oxygen storage layer and a catalyst layer on a catalyst carrier, an integral structure type exhaust gas-purifying catalyst excellent in purification performance can be obtained by at least allowing the catalyst layer to contain the exhaust gas-purifying three-way catalyst 100 of the present embodiment. Such a layer configuration preferably has two or more layers in consideration of the trend of tightening of the exhaust gas regulation.

The integral structure type exhaust gas-purifying catalyst having the above layer configuration can be produced according to an ordinary method. The catalyst can be obtained by, for example, covering the surface of the catalyst carrier with the above exhaust gas-purifying three-way catalyst 100 (supporting). The method for applying the slurry-like mixture to the catalyst carrier may be performed according to an ordinary method and is not particularly limited. Any of various known coating methods, wash-coating methods, and zone-coating methods can be applied. After the slurry-like mixture is applied, the resultant can be dried or fired according to an ordinary method, thereby obtaining an integral structure type exhaust gas-purifying catalyst including a catalyst layer containing the exhaust gas-purifying three-way catalyst of the present embodiment.

In a specific example, the integral structure type exhaust gas-purifying catalyst having the above layer configuration can be obtained by, for example, mixing the above exhaust gas-purifying three-way catalyst 100, an aqueous medium, and, if necessary, a binder, other catalyst, a catalyst aid, an OSC material, various base material particles, additives, and the like known in the art at any desired ratio to prepare a slurry-like mixture, applying the resulting slurry-like mixture to the surface of the catalyst carrier such as a honeycomb structure carrier, and drying and firing the resultant.

The aqueous medium for use in preparation of the slurry-like mixture may be used in an amount so that the exhaust gas-purifying catalyst can be uniformly dispersed or dissolved in the slurry. Herein, if necessary, an acid or a base for pH adjustment can be blended, or a surfactant or a dispersing resin, for viscosity adjustment or an enhancement in dispersibility of the slurry, or the like, can be blended. The above binder is preferably used from the viewpoint that the above exhaust gas-purifying three-way catalyst is strongly attached or bound to a supporting body. Any known grinding method or mixing method, for example, grinding and mixing by a ball mill can be applied as the method for mixing the slurry.

After the slurry-like mixture is applied to the catalyst carrier, drying and/or firing can be performed according to an ordinary method. The drying temperature is not particularly limited and is, for example, preferably 70 to 200° C., more preferably 80 to 150° C. The firing temperature is not particularly limited and is, for example, preferably 300 to 650° C., more preferably 400 to 600° C. The heating unit here used can be any known heating unit such as an electric furnace or a gas furnace.

The layer configuration of the catalyst layer in the integral structure type catalyst may be a mono-layer or multi-layer structure, and is preferably a layered structure of two or more layers in the case of an application of an exhaust gas for automobiles from the viewpoint of an enhancement in catalyst performance in consideration of the trend of tightening of the exhaust gas regulation. The total amount of covering of the exhaust gas-purifying three-way catalyst 100 is not particularly limited, and is preferably 20 to 350 g/L, more preferably 50 to 300 g/L from the viewpoint of the balance between catalyst performance and pressure loss, or the like.

The above integral structure type exhaust gas-purifying catalyst can be disposed in any exhaust system of various engines. The number and the locations of such integral structure type exhaust gas-purifying catalysts disposed can be appropriately designed depending on the exhaust gas regulation. For example, when the exhaust gas regulation is critical, such catalysts can be placed at two or more locations and can be disposed under floor behind a directly-under-catalyst in an exhaust system. The catalyst composition and the integral structure type exhaust gas-purifying catalyst each containing the exhaust gas-purifying three-way catalyst 100 of the present embodiment can then exert an excellent effect on a purification reaction of CO, HC, and NOx not only at the start-up at a low temperature, but also in various running specifications including high-speed running at a high temperature.

EXAMPLES

The features of the present invention are described below in more detail with reference to Test Examples, Examples and Comparative Examples, but the present invention is not intended to be limited by such Examples at all. That is, the materials, the amounts of use, the rates, the treatment contents, the treatment procedures, and the like represented in the following Examples can be appropriately modified without departing from the gist of the present invention. Various production conditions and evaluation result values in the following Examples each mean a preferable upper limit or a preferable lower limit in embodiments of the present invention, and preferable ranges thereof may each be any range prescribed as a combination of the value of the upper limit or the lower limit and any value in the following Examples or any values in such Examples.

Measurement of Pore Distribution of Base Material Particle

The pore distribution of the base material particle was determined according to a mercury intrusion method. The pore volume was here measured by using 0.2 g of the base material particle as a sample and using a mercury porosimeter (trade names: PASCAL 140 and PASCAL 440 manufactured by Thermo Fisher Scientific) in conditions of a mercury contact angle of 130° and a surface tension of 484 dyn/cm, and the value (mode size) at the position of a peak top in the pore distribution curve of pore size-differential pore volume, here obtained, was defined as the pore size of the base material particle.

Average Particle Size $D_{50}$ of Base Material Particle

The particle size distribution of the exhaust gas-purifying three-way catalyst after duration treatment was measured using a laser diffraction type particle size distribution measuring apparatus (for example, laser diffraction type particle size distribution measuring apparatus SALD-7100 manufactured by Shimadzu Corporation), and the median size thereof was defined as the average particle size $D_{50}$ of the base material particle.

Average Particle Size of Catalytically Active Particle

An average with respect to 20 points randomly selected in a SEM image at a 10000-fold magnification, of the exhaust gas-purifying three-way catalyst after duration treatment, was calculated, and defined as the average particle size of the catalytically active particle.

Measurement of BET Specific Surface Area

The BET specific surface area was determined as the BET specific surface area of the exhaust gas-purifying three-way catalyst after duration treatment by use of a specific surface area/pore distribution measuring apparatus (trade name: BELSORP-mini II, manufactured by MicrotracBEL Corp.) and analysis software (trade name: BEL_Master, manufactured by MicrotracBEL Corp.), according to a BET one-point method.

Example 1

A base material particle used was a ceria-zirconia-based composite oxide forming a solid solution with Nd and Pr (designated as Nd/Pr—CZ, $Nd_2O_3$: 7% by mass, $Pr_5O_{11}$: 7% by mass, $CeO_2$: 28% by mass, $ZrO_2$: 58% by mass, $D_{50}$=3.40 μm), having a pore size of 601 nm as measured by a mercury intrusion method. Next, a solution of palladium (II) nitrate (which was contained at a rate of 20% by mass in terms of PdO) was prepared, a base material particle of Nd/Pr—CZ described above was impregnated with the palladium (II) nitrate solution, and the resultant was fired at 600° C. for 30 minutes, thereby obtaining a powder catalyst (amount supported in terms of Pd: 2.0% by mass) of Example 1. Thereafter, the resulting powder catalyst was left to still stand in a furnace, and heat treatment at 1050° C. for 12 hours was performed with sequential switching of the external atmosphere to A/F=12.8 and an oxygen atmosphere being repeated, thereby obtaining an exhaust gas-purifying three-way catalyst (amount supported in terms of Pd: 2.0% by mass, $D_{50}$=3.38 μm) after duration treatment, of Example 1.

Example 2

A powder catalyst (amount supported in terms of Pd: 2.0% by mass) of Example 2, and an exhaust gas-purifying three-way catalyst (amount supported in terms of Pd: 2.0% by mass, $D_{50}$=3.63 μm) after duration treatment, of Example 2, were obtained in the same manner as in Example 1 except that a ceria-zirconia-based composite oxide forming a solid solution with Nd and Pr (designated as Nd/Pr—CZ, $Nd_2O_3$: 7% by mass, $Pr_5O_{11}$: 7% by mass, $CeO_2$: 28% by mass, $ZrO_2$: 58% by mass, $D_{50}$=1.27 μm), having a pore size of 285 nm as measured by a mercury intrusion method, was used as the base material particle.

Example 3

A powder catalyst (amount supported in terms of Pd: 2.0% by mass) of Example 3, and an exhaust gas-purifying three-way catalyst (amount supported in terms of Pd: 2.0% by mass, $D_{50}$=7.66 μm) after duration treatment, of Example 3, were obtained in the same manner as in Example 1 except that a ceria-zirconia-based composite oxide forming a solid solution with Nd and Pr (designated as Nd/Pr—CZ, $Nd_2O_3$: 7% by mass, $Pr_5O_{11}$: 7% by mass, $CeO_2$: 28% by mass, $ZrO_2$: 58% by mass, $D_{50}$=2.78 μm), having a pore size of 132 nm as measured by a mercury intrusion method, was used as the base material particle.

Comparative Example 1

A powder catalyst (amount supported in terms of Pd: 2.0% by mass) of Comparative Example 1, and an exhaust gas-purifying three-way catalyst (amount supported in terms of Pd: 2.0% by mass, $D_{50}$=10.04 μm) after duration treatment, of Comparative Example 1, were obtained in the same manner as in Comparative Example 1 except that a ceria-zirconia-based composite oxide forming a solid solution with Nd and Pr (designated as Nd/Pr—CZ, $Nd_2O_3$: 7% by mass, $Pr_5O_{11}$: 7% by mass, $CeO_2$: 28% by mass, $ZrO_2$: 58% by mass, $D_{50}$=10.42 μm), having a pore size of 49 nm as measured by a mercury intrusion method, was used as the base material particle.

The resulting exhaust gas-purifying three-way catalysts after duration treatment, of Examples 1 to 3 and Comparative Example 1, were subjected to measurements of various physical properties described above. The results are shown in Table 1.

TABLE 1

| | Pore size of base material particle (nm) | Total pore volume of base material particle ($cm^3/g$) | Average particle size of catalytically active particle after duration treatment (nm) | Average particle size of base material particle after duration treatment $D_{50}$ (μm) | BET specific surface area after duration treatment ($m^2/g$) |
|---|---|---|---|---|---|
| Example 1 | 601 | 0.694 | 59 | 3.38 | 10.0 |
| Example 2 | 285 | 1.092 | 88 | 3.63 | 11.8 |
| Example 3 | 132 | 0.993 | 97 | 7.66 | 20.0 |
| Comparative Example 1 | 49 | 0.828 | 110 | 10.04 | 27.0 |

Figure 2:
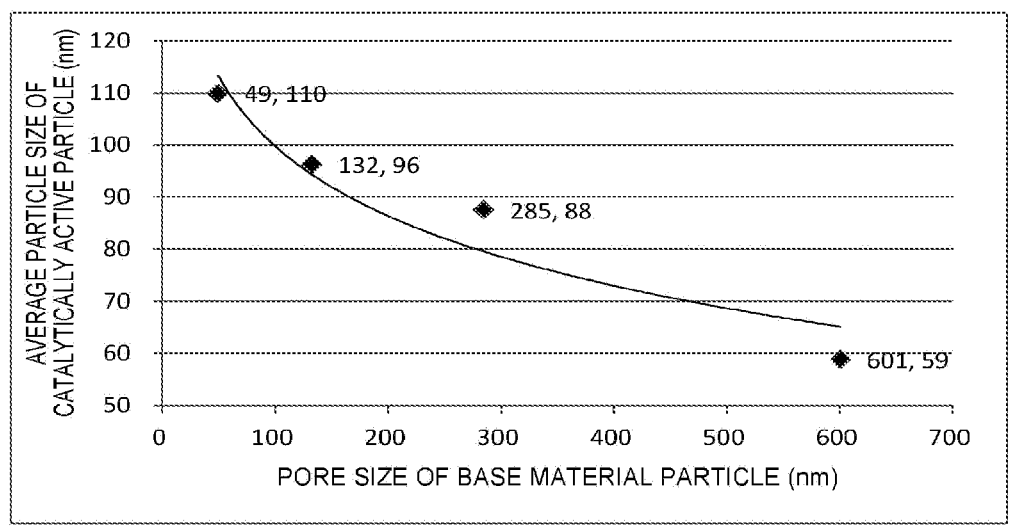
FIG. 2 represents a graph of "Pore size of base material particle"–"Average particle size of catalytically active particle" in each exhaust gas-purifying three-way catalyst of Examples 1 to 3 and Comparative Example 1.

FIG. 2 represents a graph of "Pore size of base material particle"–"Average particle size of catalytically active particle" in each exhaust gas-purifying three-way catalyst after duration treatment of Examples 1 to 3 and Comparative Example 1. As clear from FIG. 2, it was confirmed that the average particle size of the catalytically active particle tended to be reduced according to an increase in pore size of the base material particle.

Wall Flow Type Integral Structure Type Catalyst

Next, each of the powder catalysts of Examples 1 to 3 and Comparative Example 1 was used to produce each wall flow type integral structure type catalyst of Examples 1 to 3 and Comparative Example 1, where an OSC layer and a catalyst layer were provided on a honeycomb carrier 1, in the listed order, according to the following procedure.

First, 0.2 parts by mass of a rhodium nitrate solution, in terms of mass of Rh, was metered, diluted with pure water, and supported on 39.8 parts by mass of an OSC material (ceria-zirconia powder, BET specific surface area: 70 $m^2/g$, pore size: 15 nm, average particle size $D_{50}$=10 μm) by impregnation. The water-containing powder was fired in the air at 500° C. for 1 hour, thereby preparing 0.5% by mass of a Rh-supported ceria-zirconia powder (Rh-supported OSC material).

Mixed were 50 parts by mass of the resulting Rh-supported OSC material and 50 parts by mass of a γ-alumina powder (BET specific surface area: 150 m$^2$/g, pore size: 15 nm, average particle size $D_{50}$=35 μm), and the mixture was diluted with pure water, thereby preparing a slurry for OSC, having a solid content concentration of 20% by mass. The honeycomb carrier 1 was coated with the resulting slurry for OSC, according to a wash-coating method, and dried, thereby producing an OSC layer.

Next, 0.8 parts by mass of a palladium nitrate solution, in terms of mass of Pd, was metered, diluted with pure water, and supported on 39.8 parts by mass of a γ-alumina powder (BET specific surface area: 150 m$^2$/g, pore size: 15 nm, average particle size $D_{50}$=10 μm) by impregnation. The water-containing powder was fired in the air at 500° C. for 1 hour, thereby preparing 2.0% by mass of a Pd-supported alumina powder. Pure water was added to the γ-alumina powder, and grinding treatment was performed in a wet milling apparatus, thereby obtaining an alumina-dispersed slurry having an average particle size $D_{50}$ of 1.5 μm. Thereto was added 152 g of barium sulfate having a crystallite diameter of 450 nm, dispersed and mixed by a mixer, the resulting mixed slurry was formed into a particle by a spray dryer so that the average particle size reached 15 μm, and furthermore the resultant was fired at 450° C. for 1 hour, thereby preparing 15.2% by mass of a barium sulfate-alumina powder.

Mixed were 49 parts by mass of the resulting Pd-supported alumina powder, 49 parts by mass of the powder catalyst of each of Examples 1 to 3 or Comparative Example 1, and 2 parts by mass of the resulting barium sulfate-alumina, and the mixture was diluted with pure water, thereby preparing a slurry for a catalyst layer, having a solid content concentration of 20% by mass. The OSC layer on the honeycomb carrier 1 was coated with the resulting slurry for a catalyst layer, according to a wash-coating method, and dried, thereby producing a catalyst layer.

Thereafter, the resulting layered article was left to still stand in a duration furnace, and subjected to exposure treatment to a high temperature (duration treatment), thereby obtaining each wall flow type integral structure type catalyst of Examples 1 to 3 and Comparative Example 1, in which the OSC layer and the catalyst layer were provided on the honeycomb carrier 1, in the listed order. The exposure treatment to a high temperature was performed by performing heat treatment at 1050° C. for 12 hours, with sequential switching of the external atmosphere to A/F=12.8 and an oxygen atmosphere being repeated.

Honeycomb Carrier 1

Honeycomb carrier 1: wall flow type honeycomb substrate made of cordierite, 1 inch diameter×50 mmL (25 cc), 340 cpsi/10 mil Amount of supporting by catalyst: amount of catalyst per volume of honeycomb carrier: 150 g/L Flow Through Type Integral Structure Type Catalyst Next, each of the powder catalysts of Examples 1 to 3 and Comparative Example 1 was used to produce each flow through type integral structure type catalyst of Examples 1 to 3 and Comparative Example 1, where an OSC layer and a catalyst layer were provided on a honeycomb carrier 1, in the listed order, according to the following procedure.

Each flow through type integral structure type catalyst of Examples 1 to 3 and Comparative Example 1 was obtained in the same procedure as in the method for producing the wall flow type integral structure type catalyst except that the following honeycomb carrier 2 was used instead of the honeycomb carrier 1. The exposure treatment to a high temperature was performed by performing heat treatment at 1050° C. for 12 hours, with sequential switching of the external atmosphere to A/F=12.8 and an oxygen atmosphere being repeated, in the same manner as in the method for producing the wall flow type integral structure type catalyst.

Honeycomb Carrier 2

Honeycomb carrier 2: flow through type honeycomb substrate made of cordierite, 1 inch diameter×50 mmL (25 cc), 600 cpsi/3.5 mil Amount of supporting by catalyst: amount of catalyst per volume of honeycomb carrier: 150 g/L Laboratory Measurement (CO, HC, NOx) of Exhaust Gas Conversion Efficiency Next, each of the powder catalysts of Example 2 and Comparative Example 1 was used and evaluated with respect to purification performance of an exhaust gas. The honeycomb carrier was here coated with an underlayer and a catalyst layer in the following procedure according to a wash-coating method, and dried, and exposure treatment to a high temperature (duration treatment) was performed in a duration furnace, thereby producing each exhaust gas-purifying three-way catalyst sample (integral structure type catalyst) of Example 2 and Comparative Example 1. The exposure treatment to a high temperature was performed by performing heat treatment at 1050° C. for 12 hours, with sequential switching of the external atmosphere to A/F=12.8 and an oxygen atmosphere being repeated.

First, 50 parts by mass of a γ-alumina powder (BET specific surface area: 150 m$^2$/g, pore size: 15 nm, average particle size $D_{50}$=35 μm) was diluted with pure water, thereby preparing a slurry for an underlayer, having a solid content concentration of 20% by mass. The honeycomb carrier 1 was coated with the resulting slurry for an underlayer, according to a wash-coating method, and dried, thereby producing an underlayer.

Next, 0.8 parts by mass of a palladium nitrate solution, in terms of mass of Pd, was metered, diluted with pure water, and supported on 39.8 parts by mass of a γ-alumina powder (BET specific surface area: 150 m$^2$/g, pore size: 15 nm, average particle size $D_{50}$=10 μm) by impregnation. The water-containing powder was fired in the air at 500° C. for 1 hour, thereby preparing 2.0% by mass of a Pd-supported alumina powder. Pure water was added to the γ-alumina powder, and grinding treatment was performed in a wet milling apparatus, thereby obtaining an alumina-dispersed slurry having an average particle size $D_{50}$ of 1.5 μm. Thereto was added 152 g of barium sulfate having a crystallite diameter of 450 nm, dispersed and mixed by a mixer, the resulting mixed slurry was formed into a particle by a spray dryer so that the average particle size reached 15 μm, and furthermore the resultant was fired at 450° C. for 1 hour, thereby preparing 15.2% by mass of a barium sulfate-alumina powder.

Mixed were 49 parts by mass of the resulting Pd-supported alumina powder, 49 parts by mass of the powder catalyst of Example 2 or Comparative Example 1, and 2 parts by mass of the resulting barium sulfate-alumina, and the mixture was diluted with pure water, thereby preparing a slurry for a catalyst layer, having a solid content concentration of 20% by mass. The underlayer on the honeycomb carrier 3 was coated with the resulting slurry for a catalyst layer, according to a wash-coating method, and dried, thereby producing a catalyst layer.

Thereafter, the resulting layered article was left to still stand in a duration furnace, and subjected to exposure treatment to a high temperature (duration treatment), thereby obtaining each integral structure type catalyst of Example 2 and Comparative Example 1, where the underlayer and the catalyst layer were provided on the honeycomb carrier 3, in the listed order. The exposure treatment to a high temperature was performed by performing heat treatment at 1050° C. for 12 hours, with sequential switching of the external atmosphere to A/F=12.8 and an oxygen atmosphere being repeated.

Honeycomb Carrier 3

Figure 3:
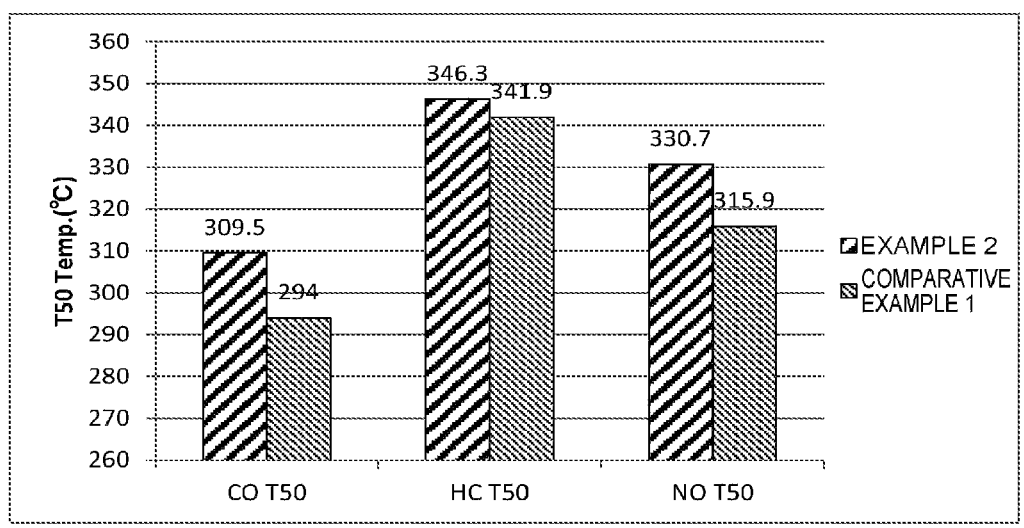
FIG. 3 is a graph representing purification performance of each integral structure type catalyst of Example 2 and Comparative Example 1.

Honeycomb carrier 3: flow through type honeycomb substrate made of cordierite, 1 inch diameter×50 mmL (25 cc), 600 cpsi/3.5 mil Amount of supporting by catalyst: amount of catalyst per volume of honeycomb carrier: 150 g/L Next, each of the integral structure type catalysts of Example 2 and Comparative Example 1 was evaluated with respect to purification performance of CO, HC and NOx. A sample for performance evaluation, subjected to heat treatment in an air atmosphere in a furnace at 1050° C. for 12 hours, was mounted in a reaction vessel of a model gas reaction apparatus. Evaluation of the model gas was performed in the following conditions, and light-off performance (temperature at which the conversion efficiency reached 50%) was determined. Herein, NOxT50 means the catalyst bed temperature at purification of 50% of NOx, COT50 means the catalyst bed temperature at purification of 50% of CO, and HCT 50 means the catalyst bed temperature at purification of 50% of HC. The evaluation results are illustrated in FIG. 3.

Evaluation Conditions of Model Gas

Model gas apparatus: SIGU manufactured by HORIBA Ltd.

Analyzer: MEXA manufactured by HORIBA Ltd.: Motor Exhaust Gas Analyzer

TABLE 2

| Range of catalyst temperature | | 100-500° C. |
|---|---|---|
| Rate of temperature rise | | 30° C./min |
| Flow rate | | 24 L/min |
| Space velocity | | 56,800 h$^{-1}$ |
| Components | $N_2$ | Balance |
| | $CO_2$ | 14.00% |
| | $O_2$ | 0.35% |
| | NO | 0.15% |
| | CO | 0.50% |
| | $C_3H_6$ | 0.04% |
| | $H_2O$ | 10.00% |

Example 4

A base material particle used was a zirconia-based composite oxide forming a solid solution with Pr (designated as Pr—Z, $Pr_5O_{11}$: 40% by mass, $ZrO_2$: 60% by mass, $D_{50}$=1.61 µm), having a pore size of 136 nm as measured by a mercury intrusion method. Next, a solution of palladium (II) nitrate (which was contained at a rate of 20% by mass in terms of PdO) was prepared, a base material particle of Pr—Z described above was impregnated with the palladium (II) nitrate solution, and the resultant was fired at 600° C. for 30 minutes, thereby obtaining a powder catalyst (amount supported in terms of Pd: 2.0% by mass) of Example 4. Thereafter, the resulting powder catalyst was left to still stand in a furnace, and heat treatment at 1050° C. for 12 hours was performed with sequential switching of the external atmosphere to A/F=12.8 and an oxygen atmosphere being repeated, thereby obtaining an exhaust gas-purifying three-way catalyst (amount supported in terms of Pd: 2.0% by mass, $D_{50}$=6.36 µm) after duration treatment, of Example 4.

Comparative Example 2

A powder catalyst (amount supported in terms of Pd: 2.0% by mass) of Comparative Example 2 and an exhaust gas-purifying three-way catalyst (amount supported in terms of Pd: 2.0% by mass, $D_{50}$=7.23 µm) after duration treatment, of Comparative Example 2, were obtained in the same manner as in Example 4 except that a zirconia-based composite oxide forming a solid solution with Pr (designated as Pr—Z, $Pr_5O_{11}$: 40% by mass, $ZrO_2$: 60% by mass, $D_{50}$=6.97 µm), having a pore size of 25 nm as measured by a mercury intrusion method, was used as the base material particle.

Example 5

A base material particle used was a zirconia-based composite oxide forming a solid solution with Nd (designated as Nd—Z, $Nd_2O_3$: 42.5% by mass, $ZrO_2$: 57.5% by mass, $D_{50}$=1.74 µm), having a pore size of 172 nm as measured by a mercury intrusion method. Next, a solution of palladium (II) nitrate (which was contained at a rate of 20% by mass in terms of PdO) was prepared, a base material particle of Nd—Z described above was impregnated with the palladium (II) nitrate solution, and the resultant was fired at 600° C. for 30 minutes, thereby obtaining a powder catalyst (amount supported in terms of Pd: 2.0% by mass) of Example 5. Thereafter, the resulting powder catalyst was left to still stand in a furnace, and heat treatment at 1050° C. for 12 hours was performed with sequential switching of the external atmosphere to A/F=12.8 and an oxygen atmosphere being repeated, thereby obtaining an exhaust gas-purifying three-way catalyst (amount supported in terms of Pd: 2.0% by mass, $D_{50}$=3.45 µm) after duration treatment, of Example 5.

Comparative Example 3

A powder catalyst (amount supported in terms of Pd: 2.0% by mass) of Comparative Example 3 and an exhaust gas-purifying three-way catalyst (amount supported in terms of Pd: 2.0% by mass, $D_{50}$=9.67 µm) after duration treatment, of Comparative Example 3, were obtained in the same manner as in Example 5 except that a zirconia-based composite oxide forming a solid solution with Nd (designated as Nd—Z, $Nd_2O_3$: 42.5% by mass, $ZrO_2$: 57.5% by mass, $D_{50}$=7.37 µm), having a pore size of 21 nm as measured by a mercury intrusion method, was used as the base material particle.

The resulting exhaust gas-purifying three-way catalysts after duration treatment, of Examples 4 and 5 and Comparative Examples 2 and 3, were subjected to measurements of various physical properties described above. The results are shown in Table 3.

TABLE

| | Pore size of base material particle (nm) | Total pore volume of base material particle ($cm^3/g$) | Average particle size of catalytically active particle after duration treatment (nm) | Average particle size of base material particle after duration treatment $D_{50}$ (μm) | BET specific surface area after duration treatment ($m^2/g$) |
|---|---|---|---|---|---|
| Example 4 | 136 | 0.795 | 216 | 6.36 | 14.8 |
| Comparative Example 2 | 25 | 0.804 | 236 | 7.23 | 16.9 |
| Example 5 | 172 | 0.780 | 214 | 3.45 | 15.3 |
| Comparative Example 3 | 21 | 0.841 | 237 | 9.67 | 16.7 |

Figure 4:
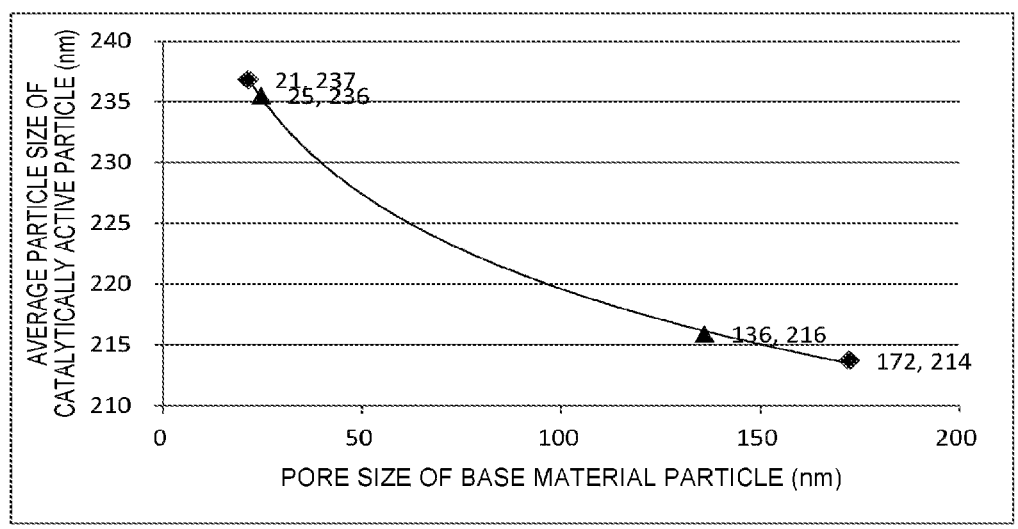
FIG. 4 represents a graph of "Pore size of base material particle"–"Average particle size of catalytically active particle" in each exhaust gas-purifying three-way catalyst of Examples 4 and 5 and Comparative Examples 2 and 3.

FIG. 4 represents a graph of "Pore size of base material particle"–"Average particle size of catalytically active particle" in each exhaust gas-purifying three-way catalyst after duration treatment, of Examples 4 and 5 and Comparative Examples 2 and 3. As clear from FIG. 4, it was confirmed that the average particle size of the catalytically active particle tended to be reduced according to an increase in pore size of the base material particle.

Wall Flow Type Integral Structure Type Catalyst

Each wall flow type integral structure type catalyst of Examples 4 and 5 and Comparative Examples 2 and 3, where the OSC layer and the catalyst layer were provided on the honeycomb carrier 1, in the listed order, was produced in the same manner as in Example 1 except that each powder catalyst of Examples 4 and 5 or Comparative Examples 2 and 3 was used instead of the powder catalyst of Example 1.

Flow Through Type Integral Structure Type Catalyst

Each flow through type integral structure type catalyst of Examples 4 and 5 and Comparative Examples 2 and 3, where the OSC layer and the catalyst layer were provided on the honeycomb carrier 2, in the listed order, was produced in the same manner as in Example 1 except that each powder catalyst of Examples 4 and 5 or Comparative Examples 2 and 3 was used instead of the powder catalyst of Example 1.

INDUSTRIAL APPLICABILITY

The exhaust gas-purifying three-way catalyst and the integral structure type exhaust gas-purifying catalyst of the present invention can be each widely and effectively utilized as a three-way catalyst for decreasing NOx, CO, HC, and the like in an exhaust gas, and can be each particularly effectively utilized in, for example, not only an application of a diesel engine, but also an application of a gasoline engine which is required to have higher heat resistance than that of a diesel engine. The exhaust gas-purifying three-way catalyst of the present invention can also be effectively utilized as TWC for a directly-under-engine type catalytic converter, a tandem-arranged directly-under type catalytic converter, and the like.

REFERENCE SIGNS LIST

100: exhaust gas-purifying three-way catalyst
11: base material particle
11a: surface
21: catalytically active particle
31: composite particle

The invention claimed is:

1. An exhaust gas-purifying three-way catalyst, comprising a composite particle, which comprises:
   a base material particle having a pore size of 100 to 650 nm as measured by a mercury intrusion method; and
   a catalytically active particle of a platinum group element supported on the base material particle;
   wherein the base material particle comprises at least one selected from the group consisting of a ceria-based (composite) oxide doped with Nd and Pr, and a zirconia-based (composite) oxide doped with Nd and/or Pr;
   wherein the ceria-based (composite) oxide doped with Nd and Pr comprises 10 to 50% $CeO_2$ by mass, 40 to 80% $ZrO_2$ by mass, 0.1 to 10% $Nd_2O_3$ by mass, and 0.1 to 10% $Pr_5O_{11}$ by mass; and
   wherein the zirconia-based (composite) oxide doped with Nd and/or Pr comprises 50 to 70% $ZrO_2$ by mass, 0 to 50% $Nd_2O_3$ by mass, and 0 to 50% $Pr_5O_{11}$ by mass, wherein a total amount of $Nd_2O_3$ and $Pr_5O_{11}$ is 30 to 50% by mass;
   wherein a content proportion of the catalytically active particle is 0.001 to 30% by mass in total in terms of metal of the platinum group element, based on a total amount of the composite particle.

2. The exhaust gas-purifying three-way catalyst of claim 1, wherein the catalytically active particle has an average particle size of 30 to 105 nm.

3. The exhaust gas-purifying three-way catalyst of claim 1, wherein the base material particle has a BET specific surface area of 5 to 30 ($m^2/g$).

4. The exhaust gas-purifying three-way catalyst of claim 1, wherein the base material particle has an average particle size $D_{50}$ of 0.5 to 30 μm.

5. A method for producing the exhaust gas-purifying three-way catalyst of claim 1, the method comprising
   providing a base material particle;
   applying an aqueous solution comprising a platinum group element ion, to a surface of the base material particle, to obtain a treated base material particle; and
   heat treating and/or chemical treating the treated base material particle to obtain a composite particle, which comprises a base material particle having a pore size of 105 to 650 nm as measured by a mercury intrusion method and a catalytically active particle of a platinum group element supported on the base material particle, in which a content proportion of the catalytically active particle is 0.001 to 30% by mass in total in terms of metal of the platinum group element, based on a total amount of the composite particle.

6. An integral structure type exhaust gas-purifying catalyst, comprising a catalyst carrier and a catalyst layer provided on at least one surface of the catalyst carrier, wherein the catalyst layer comprises the exhaust gas-purifying three-way catalyst of claim 1.

7. The exhaust gas-purifying three-way catalyst of claim 1, wherein the ceria-based (composite) oxide doped with Nd and Pr has 20 to 40% $CeO_2$ by mass, 50 to 70% $ZrO_2$ by mass, 4 to 9% $Nd_2O_3$ by mass, and 4 to 9% $Pr_5O_{11}$ by mass.

8. The exhaust gas-purifying three-way catalyst of claim 1, wherein the zirconia-based (composite) oxide doped with Nd and/or Pr has 50 to 65% $ZrO_2$ by mass, 0 to 48% $Nd_2O_3$ by mass, and 0 to 48% $Pr_5O_{11}$ by mass, wherein a total amount of $Nd_2O_3$ and $Pr_5O_{11}$ is 35 to 48% by mass.

9. The exhaust gas-purifying three-way catalyst of claim 1, wherein the ceria-based (composite) oxide doped with Nd and Pr has 28% $CeO_2$ by mass, 58% $ZrO_2$ by mass, 7% $Nd_2O_3$ by mass, and 7% $Pr_5O_{11}$ by mass.

10. The exhaust gas-purifying three-way catalyst of claim 1, wherein the zirconia-based (composite) oxide doped with Nd and/or Pr has 60% $ZrO_2$ by mass, and 40% $Pr_5O_{11}$ by mass.

11. The exhaust gas-purifying three-way catalyst of claim 1, wherein the zirconia-based (composite) oxide doped with Nd and/or Pr has 57.5% $ZrO_2$ by mass, and 42.5% $Nd_2O_3$ by mass.

* * * * *